June 23, 1959  H. R. BILLETER  2,891,435
LATHE
Filed Sept. 30, 1952  7 Sheets-Sheet 2

INVENTOR.
Henry Robert Billeter,
BY
Fidler, Coome + Beardsley
Attys.

United States Patent Office 2,891,435
Patented June 23, 1959

2,891,435
LATHE

Henry Robert Billeter, Highland Park, Ill., assignor to Ammco Tools, Inc., North Chicago, Ill., a corporation of Illinois Application September 30, 1952, Serial No. 312,345

5 Claims. (Cl. 82—2)

The present invention relates to lathes and more particularly to a lathe having novel construction for mounting and adjusting the cutting tool, or lathe tool, rotating the spindle and the work carried thereby, and feeding the spindle and the work relative to the cutting tool.

The lathe is particularly adaptable to use in connection with brake drums, although it is not limited to such use.

An object of the invention is to provide a lathe having novel mounting means for a cutting tool that is of exceedingly simple and sturdy construction.

Another object is to provide a lathe including simple mounting means for a cutting tool having wide-spread points of support whereby the cutting tool and mounting means are capable of withstanding great forces imposed thereon.

A further object is to provide a lathe having a work-carrying spindle arranged for rotation and longitudinal feeding movement, and novel means for mounting a cutting tool including an element supported at widely spaced points and disposed for the greater part within the lateral limits of the lathe thereby resulting in a compact arrangement, and transversely adjustable for moving the cutting tool in radial directions relative to the axis of the spindle.

A still further object is to provide a lathe of the character just referred to, in which the element mounting the cutting tool is disposed for the greater part within the frame structure of the lathe, thereby resulting in a relatively compact arrangement, and novel means is provided for making adjustment of the element and for sealing the interior of the structure against the entry of foreign particles such, for example, as particles removed from the workpiece incident to the cutting operation.

Another object is to provide a lathe having a frame and a rotatable spindle, in which novel construction is provided for removably mounting the spindle in the frame.

Still another object is to provide a lathe having a frame, and a rotatable spindle with certain operating elements assembled thereon, in which novel construction is provided for removably mounting the spindle assembly in the frame.

Another object is to provide a lathe having work holding and rotating means and a cutting tool, one of which is movable relatively to the other in a feeding direction, and novel infinitely variable means for producing the feeding movement referred to.

A further object is to provide a power transmitting mechanism of mechanical nature capable of infinitely variable speed ratio between the input and output elements.

A still further object is to provide variable speed feed means capable of maintaining constant speed ratio between its input and output elements despite changes in temperature to which it is subjected.

Another object is to provide variable speed feed means having rotatable input and output shafts, in which the torque on the output shaft remains constant in all speed ratios between the shafts.

Still another object is to provide variable speed feed means having rotatable input and output shafts in which the torque on the output shaft remains constant in all speeds thereof, thereby enabling the use of safety release means operative for releasing at any predetermined setting regardless of the rate of speed of the output shaft.

A further object is to provide a mechanical variable speed feed means having an input shaft and an output shaft, utilizing differential gear drive between the input shaft and the output shaft.

Another object is to provide novel variable speed power transmitting mechanism of mechanical nature that is smooth in operation in and through all speeds within its range.

A still further object is to provide mechanical variable speed power transmitting mechanism, having an input shaft and an output shaft, and differential gearing interposed between the shafts, in which slippage means is included for controlling the differential gearing, in an arrangement in which the slippage means also provides a safety release feature, and in which spring means having a flat deflection curve is utilized for controlling the slippage means, whereby the reaction force necessary for causing slippage of the slippage means is constant for all speeds of the output shaft.

Another object is to provide mechanical variable speed power transmitting mechanism, having an input shaft and an output shaft, differential gearing between the shafts, and slippage means for controlling the differential gearing, wherein resistance encountered in the mechanism is utilized for aiding the drive of the output element.

Still another object is to provide a mechanical variable speed power transmitting mechanism having an input element and an output element, and having safety release means including mutually rotatable, interengaging friction elements arranged for slippage therebetween without misshaping or otherwise impairing the elements.

A further object is to provide novel power transmitting mechanism which by virtue of its construction is adapted to simple servicing operations.

A still further object is to provide a variable speed power transmitting mechanism of mechanical nature, including slippage means interposed between the input and output elements, in which the slippage means includes constantly rotating elements, whereby when slippage occurs, the rotating elements do not wear out of true shape or otherwise wear in such manner as to cause misshaping of the elements.

Another object is to provide a lathe of the character referred to including a cast frame of novel and simple construction having a minimum number of bores for supporting other parts of the lathe.

Other objects and advantages will be apparent upon reference to the following detail description taken in conjunction with the accompanying drawings, in which—

Figure 4 is an enlarged, vertical longitudinal sectional view of the lathe, taken on line 4—4 of Figure 1;

Referring in detail to the accompanying drawings, the lathe includes a frame or stand 12 which supports all of the other parts of the lathe, being preferably made of castings and is of simple form, so constructed that it need be provided with a minimum number of finished surfaces, such as bearing bores. The frame 12 includes a main part 14 which is in the form of a unitary casting, and also includes certain other minor parts for enclosing certain operating parts of the lathe.

The casting 14 is of generally hollow construction and includes a lower surrounding skirt portion 16 which may be open at the bottom defining a chamber 18 and serving as the means for supporting the lathe on a suitable supporting surface such as a bench. The skirt portion 16 may have an outturned flange 20 having suitable holes 22 for receiving securing means such as screws for anchoring the lathe firmly in place on its supporting surface. The chamber 18 is defined at its upper limit by a transverse wall 24 disposed generally horizontal and forming with the side walls of the casting thereabove, a well 26 for receiving a supply of oil. The upper part of the casting above the transverse wall 24 is also hollow and enclosed by a portion 28 having aligned openings, one of which is surrounded by an inturned tubular portion 30 having a bearing bore 31 and extending inwardly toward the opposite open end 32. Detachably mounted on the open end 32 is a flanged bearing member 34 having a bearing 36 in axial alignment with the bearing 31, the bearings receiving and rotatably supporting a spindle 38 in a manner to be described in detail later. The flanged bearing member 34 may be secured to the frame by suitable means such as screws 40.

The spindle 38 is mounted in the frame for rotation and longitudinal or axial feed movement therein. In keeping with the simplicity of the lathe, the spindle is provided with means for mounting the workpiece which, for example, in the present instance may be a brake drum. The provision of mounting the workpiece on the spindle eliminates the necessity for a supporting element for the cutting or lathe tool as has been needed in most previously known types of lathes of this general nature. For the purpose of feeding the spindle axially or longitudinally in the stand so as to carry the workpiece and move it relatively to the cutting tool which is fixed in any given setting of the lathe, novel feed means or power transmitting mechanism 42 is provided which will be described in detail later. Suffice it to say at the present that the feed means 42 is supported on the spindle 38 and a lead screw 44, the feed means being actuated in response to the rotation of the spindle and the lead screw 44 being rotated by the feed means and cooperating with the frame for feeding the spindle axially or longitudinally in the frame during the course of a cutting operation.

The spindle 38 at one end has a reduced diameter portion 46 directly upon which the feed means 42 is mounted. The spindle is preferably hollow having a small diameter bore 48 terminating in an enlarged diameter portion 50. The enlarged diameter portion 50 includes an inner tapered portion 52 and an outer tapered portion 54, the two latter portions forming a double taper effect for receiving an arbor 56 for mounting the workpiece in a manner to be described later. The spindle furthermore has an axial keyway 58 in its periphery for receiving a key 60 which is secured in the keyway by appropriate means such as a screw 62 extending through a hole in the key and threaded into a tapped hole in the spindle. The key 60 is thus fixed in position for cooperation with a quill 64 surrounding the spindle. The quill 64 is tubular in shape, as shown, and is so dimensioned as to have a sliding fit with the spindle. The quill is provided with a slot 66 extending through the wall thereof and extending a substantial part of the axial length of the quill for receiving the key 60 for relative sliding movement of the key in the slot in response to the axial movement of the spindle while the quill is restrained against axial or longitudinal movement. The quill provides means for imparting rotation to the spindle through the medium of engagement of the key 60 with the side wall of the slot 66, and as the spindle is rotated, the feed means 42 produces the axial or longitudinal feed movement of the spindle.

Positioned suitably on the quill 64 intermediate its ends is a circumferential rib 68 having a shoulder 70 against which is butted a ring gear 72 having worm gear teeth 74, surrounding the quill and secured thereto by suitable means such as a screw 76 inserted through a radial hole in the ring gear and threaded into a registered threaded hole in the wall of the quill. Thrust washers 78 are interposed between the respective ends of the quill and the portions 30 and 34 and in a known manner bushings 80 are fitted on the spindle in the bores 31 and 36 outwardly of the two washers 78. The assembly is provided with ring seals 82 of known and approved construction fitted in suitable counter bores in the frame and member 34.

The construction of the frame and the spindle with its appurtenant fittings, as above described, lends them to assembly in an easy and simple manner. Upon removal of the screws 40, the member 34 is removable from the frame and upon removal of the member 34, the entire spindle and spindle assembly together with the feed means 42 is removable from the stand merely by withdrawing it therefrom out through the open end 32 of the frame. The open end 32 is of sufficient internal dimension as to enable the ring gear 74 to be removed therethrough, the ring gear having the largest diameter of any of the elements mounted on the spindle in the interior of the frame. In assembling the spindle and its associated parts described above, the cap 34 with the bushing 80 and the ring seal 82 fitted therein, is inserted over the end of the spindle. The thrust washer 78 may then be fitted over the spindle followed by the quill 64 which may first have the ring gear 72 fitted thereon. However, the ring gear may be fitted in place in a later step in the assembling operation. The quill is adjusted on the spindle so that the slot 66 therein is in register with the keyway 58 whereupon the key 60 is inserted in the slot and keyway and secured therein by insertion of the screw 62. Following the above, the other thrust washer 78 is fitted on the spindle, and then the bushing 80 may be inserted in the bore 31 followed by the associated ring seal 82. The spindle assembly is then inserted through the open end 32 of the frame and into the bore 31 and bushing 80 therein until the bearing member 34 is fitted to the open end 32. The screws 40 may then be put in place for securing the spindle assembly in the frame. From the above, it will be seen that a simple and effective arrangement is provided for facilitating assembly of the spindle and the associated parts and for assembling the spindle assembly in the frame. Disassembly of the parts is made possible with equal facility. The spindle and associated parts are preferably disposed somewhat above the bottom of the well 26 and above a line 84 which indicates a suitable level for the oil to be maintained in the well 26. As will be brought out later, the oil is fed directly to the spindle and its parts in small quantities and finds its way similarly to the various bearing surfaces.

Figure 6:
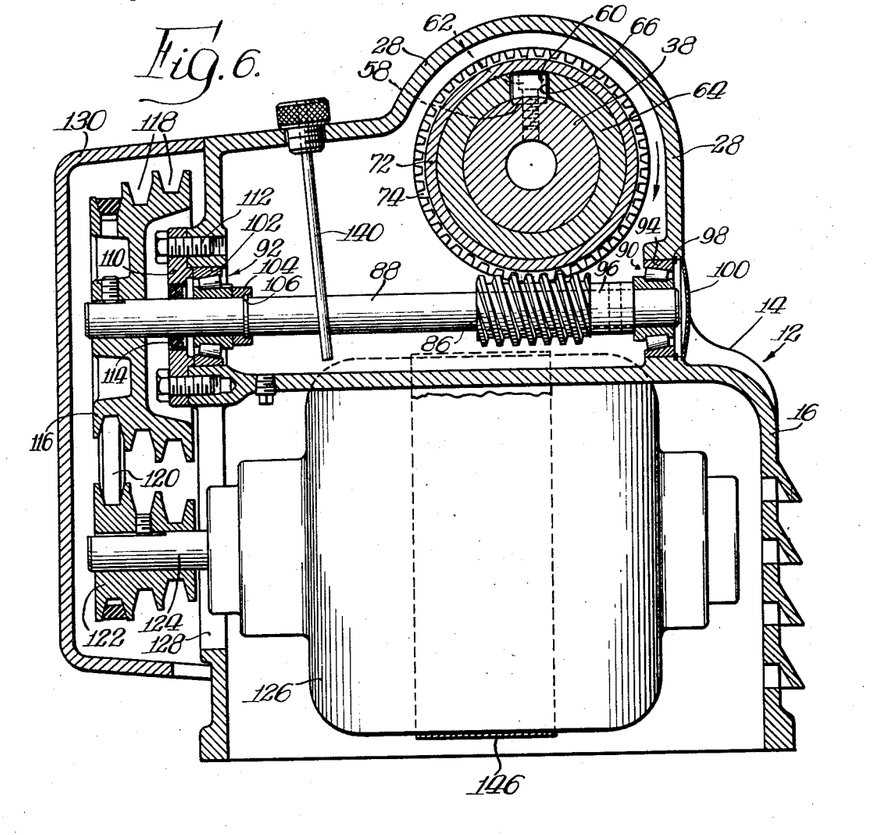
Figure 6 is a transverse vertical sectional view taken on line 6—6 of Figure 4.

The means for imparting rotation to the spindle includes a worm 86 in mesh with the worm gear 74 and mounted on a transverse shaft 88 adjacent the bottom of the gear 74 and positioned for at least partial immersion in the oil in the well 26. Upon rotation of the worm in the oil, it carries a quantity of oil with it above the level of the oil and deposits it on the worm gear 74 and from the portion of the worm gear at the top, the oil finds its way down over the surface of the quill and into the various bearing surfaces such as between the quill and washer 78, between the washers 78 and portions 30 and 34, etc. The small quantities of oil thus deposited on the various parts is found sufficient for properly lubricating the relatively moving parts. The shaft 88 is provided with suitable bearings 90 and 92 (Fig. 6), such as roller bearings of suitable and known type. The bearing 90 is mounted in a bore or hole 94 formed in the side wall of the frame being retained against displacement in one direction by engagement with the hub 96 of the worm 86 and in the other direction by a split retainer ring 98 fitted in a groove in the bore 94. The bore 94 may be enclosed by a suitable closure disc 100 snapped in a counterbore portion of the bore. The bearing 92 is suitably fitted in a bore 102 in the side wall of the frame, being restrained against axial displacement on the shaft 88 in one direction by a collar 104 which in turn is held against displacement by a split retainer ring 98 fitted in a groove in the shaft, the bearing being held against displacement in the opposite direction by a cap 110 fitted to and secured to a flanged portion of the frame wall by means of screws 112 inserted through holes in the cap and threaded into tapped holes in the wall. The cap 110 and ring 98 thus maintain the shaft in position axially. A suitable ring seal 114 is mounted in the cap 110 in surrounding relation to the shaft. The shaft extends through the wall of the frame, where a pulley 116 is mounted on the shaft, the pulley being preferably of the type having a plurality of grooves 118 of different diameters.

A belt 120 is trained over the pulley 116 and over a similar pulley 122 which may be smaller in diameter than the pulley 116 and suitably secured on the drive shaft 124 of a drive motor 126.

Figure 2:
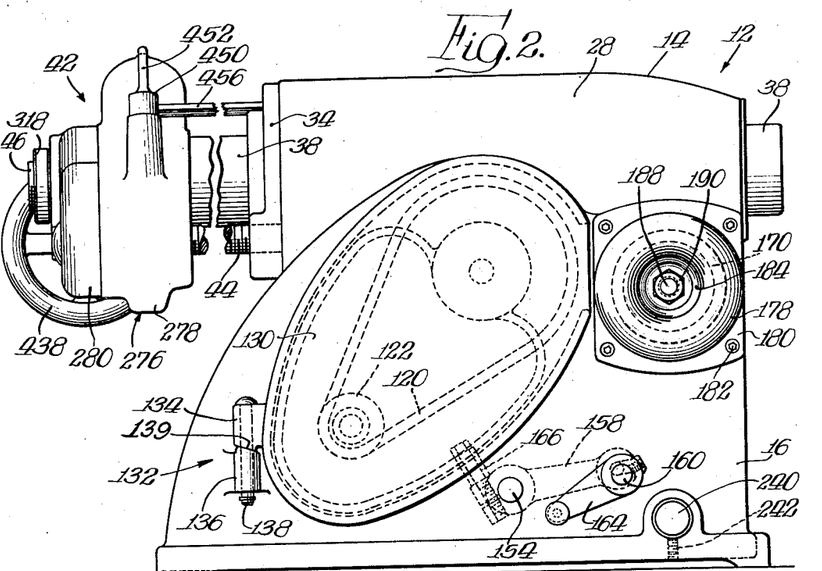
Figure 2 is an elevational view of the rear side of the lathe.

The driving motor 126 is mounted in the chamber 18 and its drive shaft 124 extends through an opening 128 to the exterior of the frame. The pulleys 122 and 116 are thus disposed outwardly of the frame proper, i.e., the casting 14, and are enclosed by a cover 130 (see Fig. 2) which is of generally shellshape and adapted to abut the casting 14 when in closed position covering the pulleys. The cover 130 is mounted on the casting 14 by suitable hinge means 132 having elements 134 and 136 preferably integral with the respective parts and having a hinge pin 138. The hinge elements are provided with interengaging inclined surfaces 139 arranged so that the cover normally falls by gravity to its closed position. As will be obvious, the cover may be swung to open position for exposing the pulleys for any needed attention and of course for assembling and disassembling the various parts made accessible thereby. A suitable oil gage 140 may be provided which, as here shown, is fitted in and extends through an opening of the top wall of the frame down to a position below the normal desired level of the oil in the well 26.

Figure 3:
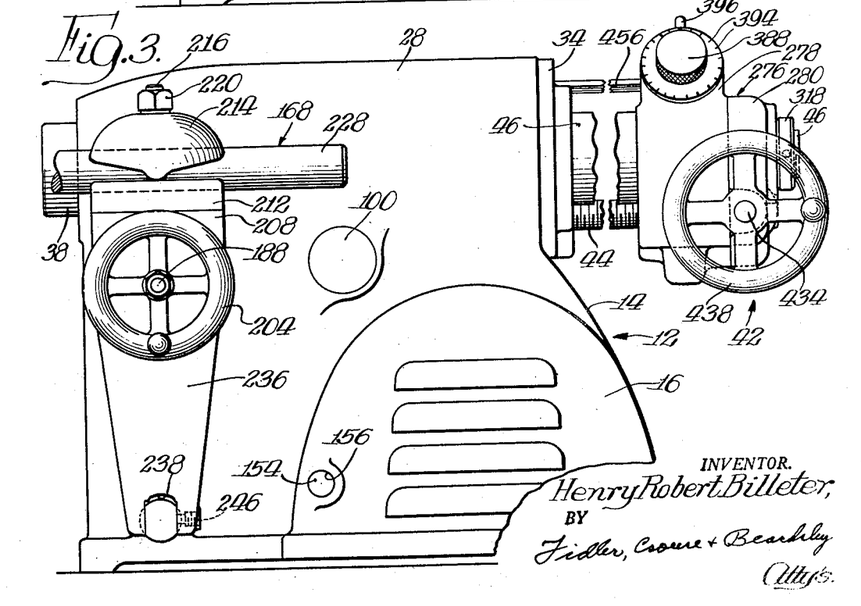
Figure 3 is an elevational view of the front or working side of the lathe.

The driving motor 126 may be of any suitable type such as an electric motor and means is provided for mounting the motor which is adapted for mounting motors of any of various sizes as may be found desirable in certain circumstances such, for example, as in different countries where electric current provisions are not uniform from country to country and, consequently, the size and type of motors are not uniform. To this end mounting means is provided for accommodating any of a number of sizes and shapes of motors and includes a saddle or cradle 142 having spaced bearing surfaces 144 for engaging the motor at circumferentially spaced points thereon. A flexible band 146 is anchored at one end to one end of the cradle 142 as at 148 and surrounds the motor, and its other end is secured to a threaded bolt 150, for example, which is inserted through the corresponding end of the cradle and is provided with a nut 152 for tightening the band on the motor. The motor is thus securely mounted on the cradle and can be positioned according to the setting of the cradle 142 which is accomplished by means of a shaft 154 on which the cradle is mounted, the shaft being supported in suitable bearing openings 156 (Figure 3) in the side walls of the skirt portion 16 of the frame. For the purpose of adjustably positioning the cradle 142 about the axis of the shaft 154, a bifurcated arm 158 (Figs. 2 and 4) is secured to the shaft and in the slot 160 of its free end is inserted an element 162 of an eccentric mounted in an opening in a side wall of the frame and having an exterior arm 164 for actuation by suitable means. Upon actuation of the arm 164 the element 162 of the eccentric swings the arm 158 and rocks the shaft 154 for positioning the cradle 142 as desired. The means for adjusting a cradle 142 serves not only for positioning the cradle according to the size of the motor used but also serves as a belt tightener. If desired, appropriate stop means 166 may be provided at a suitable location on the frame for engagement by an element on the arm 158 or other element mounted on the shaft for limiting the rocking movement of the shaft in one direction, e.g., in belt-loosening direction.

The lathe is provided with a cutting tool 168 and a novel arrangement for mounting the cutting tool which is relatively simple and eliminates mounting elements on "ways" of the tongue and groove type commonly used heretofore. The mounting means 169 for the cutting tool is arranged for movement transversely with respect to the axis of rotation of the spindle for different adjusted positions along its line of movement and effectively in radial directions with respect to the axis of the spindle. The mounting means of the lathe tool or cutting tool is provided with wide spread points of support imparting unusual stability to the mounting means and enabling a relative wide range of movement of the cutting tool in the directions mentioned.

Figure 5:
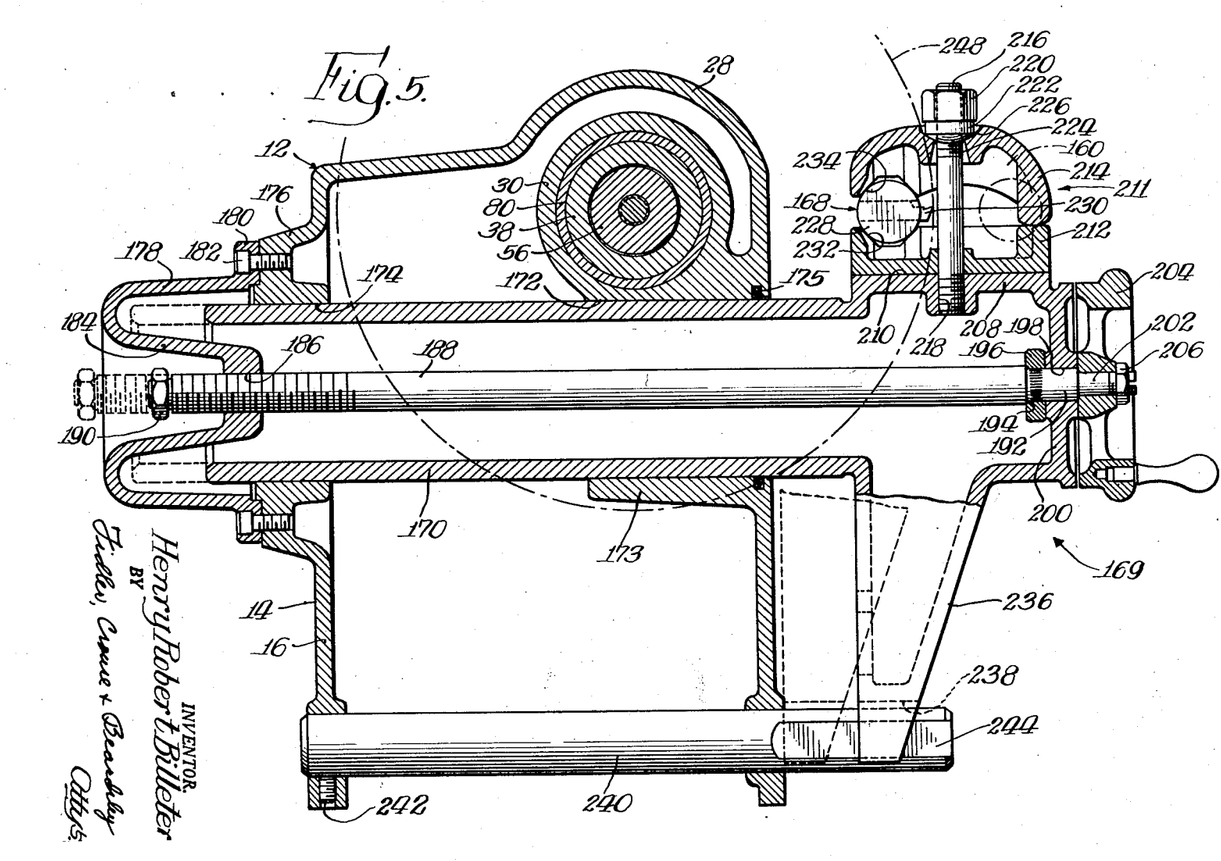
Figure 5 is an enlarged vertical transverse sectional view taken on line 5—5 of Figure 1.

The mounting means for the lathe tool or cutting tool includes a tubular element 170 (Figs. 1 and 5) slidingly mounted in aligned bores 172 and 174 which are formed in casting the frame and may be finished by a suitable operation. The bore 172 is formed in a portion 173 integral with and extending inwardly from one side wall of the casting while the bore 174 is formed in a boss 176 in the opposite side wall. The bore 172 is of substantial length and the wall defining it may be connected to the transverse wall 24 and the tubular portion 30 (Figs. 4 and 5). Adjacent the outer end of the bore, the wall is provided with a circumferential groove in which is positioned a resilient sealing ring 175. The bore 174 is effectively closed by a cap 178 which also serves as a nut, having a flange 180 for engagement with the boss 176 and secured to the latter by suitable means, such as screws 182. The cap 178 has substantial axial length, i.e., a length axially of the tubular element 170 and has a central portion 184 extending in return direction with a central threaded hole 186 for receiving the threaded end of an adjusting shaft 188 for making adjustments of the cutting tool. The inwardly extending disposition of the central portion 184 positions the hole 186 inwardly from the outer end of the cap where it is shielded against the entrance of foreign particles therethrough. The central portion accommodates the tubular member 170 when the latter is moved in retracting direction (to the left, Fig. 5), enabling partial telescoping of the parts and consequent great range of adjustment of the cutting tool. The end of the shaft 188 may be provided with a nut 190 for serving as a limiting means for threading of the shaft through the hole 186 in the corresponding direction.

The shaft 188 at its end opposite the cap 178 has a reduced diameter portion 192 on which is fitted a collar 196 in abutment with the shoulder 194, the portion 192 being preferably knurled for constraining the collar for rotation with the shaft. The reduced portion 192 has bearing support in a bore 198 in the outer end wall 200 of the element 170, and outwardly of the wall 200 the shaft is further reduced at 202 for receiving a hand wheel 204 secured thereon for rotation therewith by suitable means such as a nut 206. Upon rotation of the hand wheel 204 and consequent rotation of the shaft 188, the latter is screw threaded in the hole 186 in the cap 178 and since the latter is secured stationarily on the frame, the mounting means 169 is adjustably moved along its axis transversely of the lathe, i.e., transversely of the axis of rotation of the spindle. The tubular element 170 is mounted below the spindle whereby the cutting tool 168 being mounted on the upper side of the mounting means is disposed at substantially the level of the axis of the spindle so that upon adjusting movements of the mounting means, the cutting tool is moved in radial directions with respect to the spindle.

The tubular element 170 at its outer end has a top wall element 208 with a top, generally flat, surface 210 upon which is supported a swivelling block 211 for adjustably mounting the cutting tool 168 which includes a lower clamp element 212 and an upper clamp element 214 in the form of a cap, the two clamp elements having a stem or bolt 216 extending through apertures therein and threaded in a threaded hole 218 in the wall element 208. On the upper end of the bolt 216 is a lock nut 220 and a washer 222 having a convex under surface 224 engageable with a complementary annular concave surface 226 surrounding the aperture in the clamp element 214. Upon tightening down of the nut 220 the clamp elements 212 and 214 are brought into clamping engagement for clamping the cutting tool 168 therebetween. The cutting tool 168 includes a shank 228 and a cutting bit 230 suitably mounted in transverse hole in the shank. The shank 228 is clamped by cooperating concave clamping surfaces 232 and 234 in the clamp elements 212 and 214. These clamping surfaces are spaced apart on opposite sides of the clamp elements for engaging the shank at spaced points therealong. The clamping surfaces, if desired, may be provided only on one side of the clamping elements with respect to the bolt 216, but upon loosening of the nut 222, the clamp elements may be rotated about the bolt for alternatively positioning the cutting tool on one or the other side of the bolt 216 and thereby positioning relative to the spindle, thereby accommodating a greater range of sizes of workpieces than is provided for by adjustment of the tubular element 170. In other words, the cutting tool may be alternatively positioned according to the full and dot-dash line positions in Figures 1 and 5.

Extending downwardly from the outer end of the tubular element 170 is a guide leg 236 having a notch 238 in its lower end for receiving the outer end of a shank 240 suitably positioned in the wall elements of the frame and secured therein by suitable means such as a set screw 242. The outer end of the shank is flattened at 244 for receiving the side surfaces of the notch 238 for guiding movement of the leg 236 in the adjusting movements of the mounting means 169. A suitable plug which may be in the form of a set screw 246 (Figure 3) may be threaded in an opening of the lower end of the leg 236 for engagement with the shank 240 so as to eliminate excessive play between the leg and shank.

The mounting means 169 supports the cutting tool 168 in position for engagement with the workpiece which is supported by the spindle 38. The cutting tool normally remains stationary in any given setting of the mounting means, while the workpiece carried by the spindle is rotated relative to the cutting tool and moved axially relative to the cutting tool in the axial or longitudinal feed movement of the spindle. By virtue of the arrangement in which the cutting tool is stationary and the workpiece is fed relatively thereto, a way for mounting the cutting tool is eliminated, as compared to most previously known devices.

The frame of the lathe is of exceedingly simple form, and has a minimum number of elements requiring a surface finishing operation, such as bearing bores, as will be evident from the above description of the frame and the parts movably supported therein.

Figure 1:
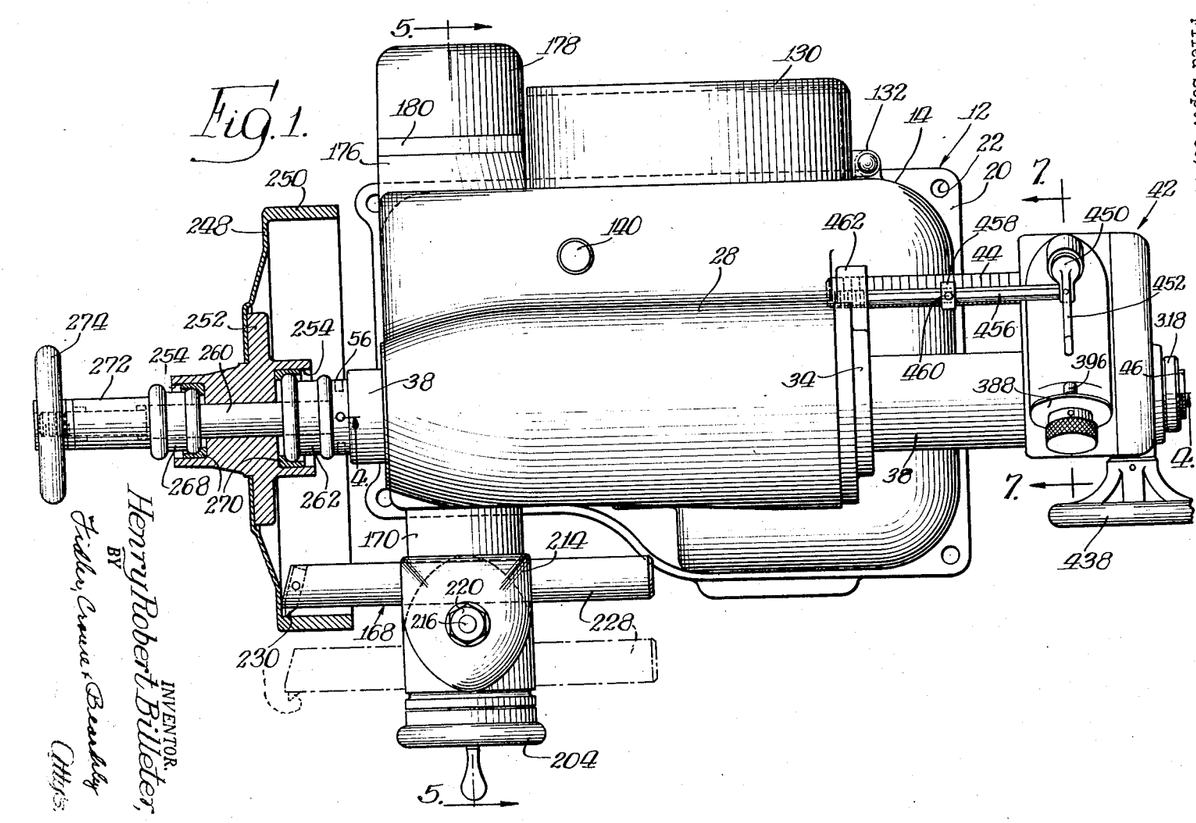
Figure 1 is a plan view of the lathe of the present invention with a brake drum mounted thereon, the latter being shown in section.

The workpiece exemplified in the drawings is a brake drum 248 (Figure 1). This brake drum is of a type used in automobiles and includes an axial flange 250 and a hub 252, the latter having a central opening and axially aligned recesses 254. The arbor 56 referred to above is shaped complementally to the outer bore portion 50 of the spindle and includes axially spaced tapered surfaces 256 and 258 wedgingly engageable with the corresponding tapered surfaces 52 and 54 in the spindle. To mount the arbor in the spindle, it is inserted in the bore portion 50, and wedged therein as referred to. The axially spaced wedging surfaces enables the arbor to be securely held, while it can be easily removed from the spindle by a relatively light blow, as by the hand. The arbor per se does not form a part of the present invention and it is believed unnecessary to go into great detail concerning it. The outer portion of the arbor is in the form of a reduced diameter shaft 260 insertable through the opening of the hub 252, collars 262 and 268 being fitted on the shaft on opposite sides of the brake drum and extending into the recesses of 254 where adapters 270 are interposed between the collars and the walls of the recesses for enabling the collars to be brought into effective firm engagement with the hub for maintaining the brake drum centered on the arbor. Outwardly of the outer collar 268 is a spacer 272 engaged by a nut 274 which may be in the form of a handwheel threaded on the outer end of the shaft 260 effective for forcing the collars relatively toward each other for clamping the brake drum and clamping the assembly rigidly and stably on the arbor in a known manner.

In the operation of cutting the brake drum, the latter is mounted on the arbor and the arbor fitted in the spindle as referred to. The spindle is then adjusted longitudinally by the feed means 42 in a manner to be later described, so as to bring the flange 250 of the brake drum to a position relative to the cutting tool as shown in Figure 1. The mounting means for the cutting tool is then adjusted transversely of the lathe, i.e., radially of the brake drum so as to position the bit 230 radially according to the size to be imparted to the brake drum. Upon rotation of the spindle, and longitudinal movement thereof in response to the feeding movement of the spindle, the flange 250 is cut or sized according to the setting of the cutting tool 168.

The mounting means 169 for the cutting tool can be adjusted through a wide range. The axial length of the cap 178 enables the tubular element 170 to be moved through a wide range while remaining in proper bearing in the bore 174. Also, in any adjusted setting or position of the mounting means, the tubular element 170 is stably supported in the wide spread bores 172 and 174. Thus, not only is the structure capable of stably supporting the mounting means, but an exceedingly simple and sturdy construction provided.

The novel construction of the lathe enables positioning of the mounting means for the cutting tool so that it actually extends through the frame. Thus a substantial portion of the mounting means is disposed within the lateral limits of the lathe frame, resulting in a greatly compact arrangement. The construction enables adjustment of cutting tool in directions directly transverse to the lathe, and in all positions of adjustment, the mounting means is stably supported at widely spaced points. Tongue and groove type ways previously commonly used for mounting the cutting tool are eliminated. The construction includes a novel and effective arrangement for preventing the entrance of foreign material into the interior of the machine and into the spaces between the parts having accurately finished surfaces. Such foreign material, including chips of material removed from the brake drum in the cutting or sizing operation are prevented from entering into the interior at one point by means of the cap 178. The central portion of the cap extends inwardly an appreciable distance from its extreme outer end whereby if any chips should fall on the cap, they would merely fall off and not enter through the threaded hole 186 because the cap acts as a shield, the shape being such that the possibility is virtually eliminated of the chips falling into the central portion 184 and being carried through the threaded opening 186. The chips and other foreign matter are prevented from entering into the bore 172 by means of the ring seal 175 surrounding the tubular element 170 at the outer end of the bore. In a similar manner, the ring seal 82 (Figure 4) surrounding the spindle prevents foreign matter from entering through the bore 31 into the interior of the frame.

The feed means 42 which also may be considered a power transmitting mechanism, constitutes an important feature of the present invention, and is utilized for feeding the spindle axially or longitudinally in response to rotation of the latter for carrying the workpiece longitudinally relative to the normally stationary cutting tool. The feed means is of mechanical nature and is capable of an infinite variation of speed ratio. It is also smooth in operation and is not subject to accidental variation in speed ratio such as may be caused by changes in temperature as in connection with other types of feed means, such for example as hydraulic devices. The feed means, as mentioned above, is mounted on the end of the spindle and is stabilized by the lead screw 44 which has screw threaded connection with the frame of the lathe. In response to the rotation of the spindle, the lead screw 44 is rotated through its screw threaded connection with the frame, feeds the spindle axially or longitudinally. The feed means 42 includes the housing 276 made up of a main portion 278 and a cap-like smaller portion 280, the two portions having bearings and other conformations for accommodating the various operating elements of the feed means. The housing portions may be secured together by suitable means such as screws 281 (Figure 9) appropriately spaced.

Fitted on the reduced portion 46 of the spindle is a bearing 282 which may be a well-known roller bearing butted against the shoulder 284 of the spindle and fitted in a recess 286 in the housing portion 278. Next adjacent the bearing 282 is a fixed friction disc member 288 of relatively short axial length, suitably secured as by keying or otherwise to the spindle for rotation therewith and against sliding movement thereon. The fixed disc member includes a ring gear element 290 and a disc element 291 having a generally axially facing surface 292 of frusto-conical shape of slight inclination relative to a plane transverse to the axis of the spindle. Cooperating with the friction disc 288 is a sliding friction disc member 294, axially slidable on the spindle, including a disc element 295 having a surface 296 of frusto-conical shape opposite and complementary to the surface 292 and arranged so that upon sliding of the disc member 294, the two surfaces 292 and 296 move relatively toward and from each other. The disc members 288 and 294, or at least the surfaces 292 and 296 thereof, are preferably of hardened steel. The sliding disc member 294 includes a portion 298 of tubular form and of substantial axial length from which is provided with a radial flange 300 spaced from the disc element 295. Surrounding the tubular portion 298 adjacent its extended end is a washer 302 retained in place by suitable means such as a split ring 304 fitted in a corresponding circumferential groove in the tubular portion. Compressed between the flange 300 and washer 302 is compression spring means 306 made up of a plurality of spring elements 308 each of annular form and normally of frusto-conical shape arranged alternately oppositely with respect to each other. The arrangement of the spring elements 308 establishes a compression curve having a substantially flat portion of considerable length and the mechanism is so designed that the spring means exerts substantially constant pressure throughout the full range of movement of the friction disc 294 in the operation of the feed means. This feature establishes a constant pressure safety release condition regardless of the degree of compression of the spring means, as will be explained more fully in detail later.

The washer 302 normally engages a spring loading cup 310 which in turn engages the inner race of the bearing 312 which may be of any suitable type and fitted in a recess 314 of the housing portion 280. Outwardly of the bearing 312 is a dust seal washer 316, while outwardly of the washer 316 is a lock nut 318 threaded on the outer end of the spindle and secured in place by suitable means such as a set screw 320.

The variable speed feed means incorporates a differential mechanism which is capable of effecting infinitely variable speed ratios, and is for that reason smooth in operation. The differential mechanism is arranged adjacent the spindle on an axis parallel therewith and includes a gearing 322 driven directly by the spindle through the medium of the ring gear 290. The differential gearing is interposed in a gear train from the spindle to the lead screw 44 and is adjustably controlled by a manually manipulable means. The differential gearing 322 is mounted on a shaft 324 which may remain stationary and is mounted in bearings 326 and 327 in the housing and secured therein by any suitable means. Included in the differential gearing is a side gear 328 having a ring gear portion 330 in constant mesh with the ring gear 290 on the fixed disc member 288. The side gear also includes a spur gear 332.

Also mounted on the shaft 324 is a pinion bushing 334 having a head portion 336 and a reduced diameter sleeve portion 338, the bushing being fitted on the shaft 324 for rotation relative thereto. The head portion 336 of the pinion bushing is provided with radially extending holes 340 for mounting differential pinions or planet gears thereon. The differential pinions 342 are mounted on pinion studs 344 for rotation relative thereto, the studs having outer head portions and inner knurled reduced diameter portions for frictional retention in the holes 340. The pinions 342 being freely rotatable on the studs are in mesh with the spur gear 332 on the side gear 338. A second side gear 346 is rotatably mounted on the reduced diameter sleeve portion of the pinion bushing 338 and includes a spur gear 348 in mesh with the pinions 342, and a ring gear 350 in mesh with a control gear controlled directly by the spindle to be described later. Also, mounted on the reduced diameter portion 338 of the pinion bushing is a ring gear 352 keyed as by a pin 354 to the pinion bushing for rotation therewith. The gear 352 constitutes the output element of the power transmitting mechanism, meshing with a gear in the clutch means interposed in the gear train between the power transmitting mechanism and the lead screw 44, as will be referred to later. The differential gearing assembly just described is retained axially in position on the shaft 324 by a feed control lever 356 also mounted on the shaft 324 for rocking movement thereon.

Figure 7:
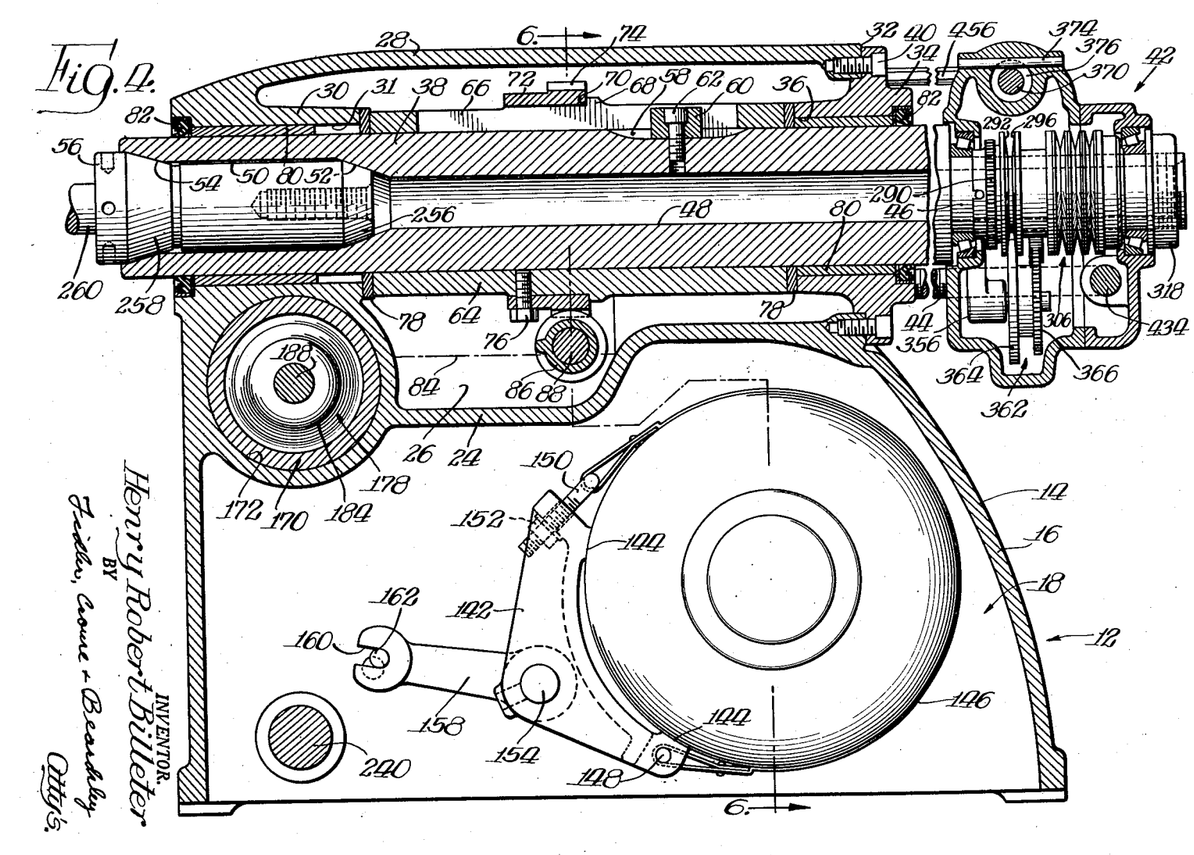
Figure 7 is an enlarged transverse vertical sectional view of the feed mechanism, taken on line 7—7 of Figure 1 and Figure 10.
Figure 10:
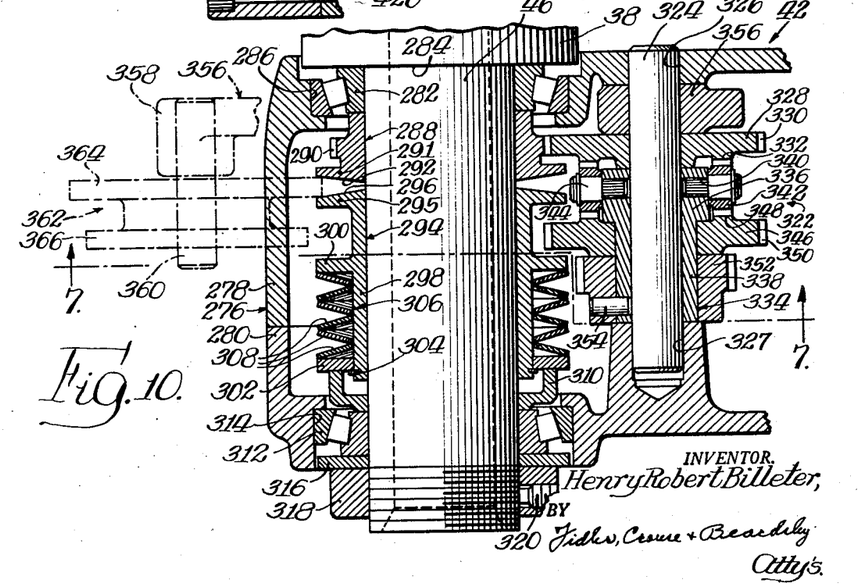
Figure 10 is a view taken on line 10—10 of Figure 7, showing the driven friction disc displaced from its normal position and shown in dot-dash lines.

The feed control lever 356 is shown in Figures 4 and 7 and partially in Figures 10. In Figure 10 a portion of the lever and the control element mounted thereon is illustrated in displaced position for the purpose of representing the action thereof since in its normal position, it would be hidden from view in Figure 10.

The feed control lever 356 is pivoted intermediate its ends on the shaft 324 and in one end 358 is secured a stud 360 on which is rotatably mounted a driven friction disc member 362 including a disc element proper 364 and a gear 366. The disc 364 and gear 366 are preferably integral. The disc member 362 or at least the disc portion 364 thereof is of hardened steel for withstanding the tendency to wear to which it is subjected. The disc 364 at its periphery extends between the disc surfaces 292 and 296 and is held in friction engagement therewith by the action of the spring means 306 in biasing the disc surfaces 292 and 296 relatively toward each other as was referred to above. The gear 366 is in constant mesh with and controls the speed of the gear 346 for controlling the rate of rotation of the output gear 352. This control is effected by positioning the disc 364 inwardly or outwardly relative to the axis of the spindle for producing various speeds of rotation of the disc relative to the spindle, as will be brought out presently.

The feed control lever 356 being pivoted on the shaft 324 which is concentric of course with the gear 346 enables the disc member 362 to be swung about the axis of the shaft while the gear 366 remains in constant mesh with the gear 346. Upon swinging the lever 356 (Figure 7) the disc 364 is moved toward or from the axis of the spindle and in response thereto is moved radially inwardly or outwardly between the disc surfaces 292 and 296. The arrangement is that, as the discs 291 and 295 are rotated, rotation is imparted thereby to the disc 364 and under the control of the latter, the rate of rotation of the gear 346 is controlled in normal operation of the device. That is, as the disc 364 is moved closer to the axis of the spindle, the disc is rotated at a slower speed than when it is moved farther from the axis, and the speed of the gear 346 of the differential is regulated accordingly. As an example of the relationship between the various parts, the diameter of the disc 364 is substantially equal to the diameter of the periphery of the disc surfaces 292 and 296. When the periphery of the disc 364 is adjacent the outer periphery of the disc surfaces 292 and 296, there is substantially a one-to-one ratio of the speed of rotation between the respective discs. The gear 366 is equal in diameter to the gear 290 and in the condition given the two gears mentioned, 290 and 366, rotate in one-to-one ratio. Accordingly, the side gears 328 and 346 of the differential gearing rotate in opposite directions in one-to-one ratio. As a consequence, the pinion bushing 334 and gear 352 remain stationary, and since the gear 352 constitutes the output element, no rotation is imparted to the lead screw 44.

When it is desired to cause rotation of the lead screw, the feed control lever 356 is swung or rocked for moving the disc 364 from the position assumed radially inwardly relative to the axis of the spindle. This movement forces the disc 364 radially inwardly of the disc surfaces 292 and 296, the spring means 306 being compressed enabling the disc surfaces to be spread accordingly. As the disc 364 is moved radially inwardly, its speed of rotation relative to the spindle is reduced. The slower speed of rotation of the disc 364 and consequently of the gear 366 reduces the speed of rotation of the side gear 346 below that of the side gear 328; as a consequence, the bushing 334 and output gear 352 are rotated slowly in accordance with the differential in speed between the side gears.

The above description of the operation of the feed means has to do with that condition wherein the lead screw is first at rest and then rotation is imparted thereto; however a similar operation is performed for varying the speed of rotation of the lead screw from a given speed of rotation, i.e., the disc-gear member 362 is moved toward or from the axis of the spindle—moving it toward the axis causing the lead screw to rotate at a greater speed, and from the axis, at a slower speed.

The feed means thus provides a wide range of speed ratios between the input and output elements. The output element can be regulated to zero rotation, and by providing the desired gear train between the output element and the lead screw, as wide a range of speed ratios as desired may thus be provided between the input element and lead screw. However, in the present instance, in view of the nature of the device to which the feed means is applied, it is desired that the lead screw be rotated at a relatively low rate of speed.

The feed means enables an infinite variation of speed ratios, with consequent fine control of the speed of rotation of the ouput element, which in a mechanical mechanism has numerous advantages. The operation is extremely smooth, there are no step-by-step changes and an inherent safety feature is present in that slippage is provided for between the disc 364 and the disc surfaces 292 and 296. If any driven element in the feed means beyond and controlled by the discs should become blocked, slippage will occur between the discs with the result that no breakage of any of the parts can result. For example, if the lead screw should become blocked and restrained against rotation, the pinion bushing 334 would remain stationary and the pinions would rotate in place. The side gear 328 would then produce rotation of the other side gear 346 at the same speed, and the disc 364 would rotate at a speed greater than the peripheral speed of that portion of the disc surfaces 292 and 296 then engaged by the disc 364.

Another important feature of the present phase of the invention is that if and when slippage occurs, none of the parts are worn objectionably in such a manner as to render any of the parts inaccurate from the standpoint of operation. The slippage that occurs between the disc 364 and disc surfaces 292 and 296 produces simply a polishing action since all of the elements remain in constant rotation, and no "flats" or other objectionable misshaped conformations are developed.

Because of the virtually constant pressure exerted by the spring means 306 throughout the range of relative movement of the sliding friction disc 294, the safety feature is of constant magnitude regardless of the setting of the mechanism; e.g., any resistance encountered is imparted through the differential gearing to the disc 364 and the reactive force counter to the resistance, as imposed by the spring means 306 is constant. Therefore, regardless of the setting of the disc 364 radially of the disc surfaces 292 and 296, slippage will occur at the same predetermined resistance encountered.

An additional important feature of the feed means is that resistance encountered aids in driving the lead screw rather than hindering it. For example resistance that operates to impede rotation of the gear 346 and reduce its speed of rotation, relative to the gear 328, aids in driving the lead screw in the manner mentioned. Such variation in the differential in speed between the gears 328 and 348 produces rotation of the pinion bushing 334 and gear 352, or increases the speed of rotation thereof, depending upon the previous condition as to rotation of the bushing, in the manner described above in connection with the operation of the feed means.

The torque produced on the output element is constant regardless of the speed of rotation thereof. The forces applied are exerted through gears 290 and 328, and the pinions 342, and since these remain in constant radially placed positions, the torque imposed is constant throughout the speed range. This is considered to be an important advantage particularly in the case of a mechanical variable speed mechanism. The constant torque feature is important in the use of a safety release means. It is desired that safety release means yield at a definite predetermined point, and in the case of constant torque, it yields at that point in all conditions of operation. A decided advantage will be seen in this arrangement, as compared with variable torque—safety release means set to release at high torque will not release properly at low torque, and vice versa.

The speed of rotation of the output element will remain constant according to the setting of the mechanism regardless of any changes of temperatures, which also is an important advantage and overcomes an objection in this respect encountered in the case of hydraulic equipment.

The means for adjustably setting the feed means for producing the desired speed ratio is accomplished by means of a feed adjusting screw 368 which includes a shaft 370 rotatably mounted in a bearing 372 formed in the housing portion 278. The shaft 370 is restrained against longitudinal movement by means of a pin 374 fitted in a transverse opening in the housing and positioned in a circumferential groove 376 in the shaft. The inner end of the shaft 370 is provided with a helical groove 378 of appropriate lineal length in which is received a pin 380 secured in the end 382 of the feed control lever 356 opposite the end 358 in which the disc member 362 is mounted. Upon rotation of the shaft 370 the pin 380 follows the helical groove and produces the desired swinging movement of the feed control lever 358 for moving the disc 364 toward and from the axis of the spindle in the manner and for the purpose described above.

The outer end of the shaft 370 projects out of the bore 372 where it has a reduced diameter portion 384 forming a shoulder 386. A dial 388 of suitable construction is fitted on the reduced end portion of the shaft in abutment with the shoulder 386 and secured on the shaft by suitable means such as a set screw 390. The dial 388 includes a flanged portion 392 on which are provided suitable indicia markings 394 (Figure 3) cooperable with a suitable indicator mark on a projection 396 on the housing adjacent the periphery of the dial. The inner surface of the dial is provided with a circumferential groove 398 in which is received a stop pin 400 secured in the housing and projecting therefrom. Another pin 401 fitted in a hole in the dial extends into the groove for engagement with the stop pin 400 for limiting the extent of rotation of the dial in both directions. Upon loosening the set screw 390, the dial may be adjusted to the desired setting relative to the shaft after which the set screw is tightened, enabling the dial to be set to properly indicate the setting of the feed means.

Figure 8:
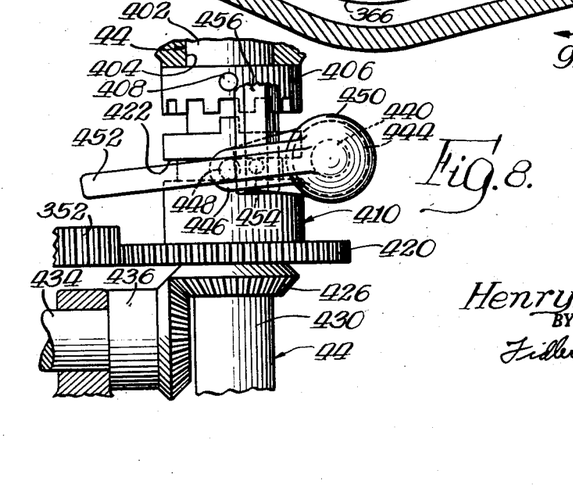
Figure 8 is a partial view of the clutch for the feed means oriented as if taken on line 8—8 of Figure 9, and with the clutch shifter superimposed thereon.
Figure 9:
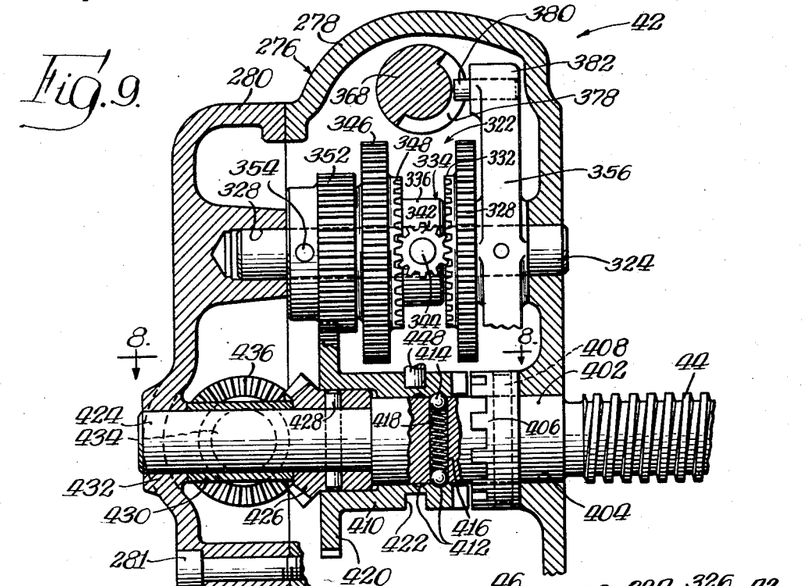
Figure 9 is a sectional view taken on a staggered line 9—9 of Figure 7.

The remaining portion of the chain of drive in the feed means 42 between that above described and the lead screw 44 is shown in Figures 7, 8 and 9. The lead screw 44 has an unthreaded shaft portion 402 mounted in a bearing 404 of the housing and extends parallel with the axes of the shaft 324 and spindle. Inwardly of the bearing 404 a jaw clutch element 406 is mounted on the shaft portion 402 and secured thereto by suitable means such as, for example, a pin 408.

Cooperating with the jaw clutch element 406 is a sliding jaw clutch element 410 mounted on the shaft portion 402 for rotation relative thereto and limited sliding movement thereon between clutching and declutching positions. The inner surface of the clutch element 410 is provided with axially spaced circumferential grooves 412 adapted for alternately receiving balls 414 fitted in a diametrical bore 416 in the shaft and biased outwardly by a compression spring 418. The spring normally retains the balls in the groove which is in register therewith and upon shifting the clutch element in the opposite direction, the balls are pressed inwardly and allowed to enter into the other groove. The arrangement normally retains the clutch in its set position and retains it in such a position in the absence of pressure applied for the purpose of shifting the clutch element.

The clutch element 410 is provided with a gear 420 which is in constant mesh with the output gear 352 of the feed means, referred to above and controlled by the differential gearing 322. The gear 420 is of lesser axial extent than the gear 352 to enable the sliding movement of the gear 420 relative to the gear 352 in response to shifting of the clutch element, whereby the gears remain constantly in mesh. The clutch element 410 is provided with a circumferential groove 422 for receiving an element of the clutch shifter as will be referred to later.

The shaft portion 402 is provided with a reduced diameter extremity 424 on which is fitted a miter gear secured thereto as by a diametrical pin 428, the hub portion of the gear being suitably received in a recess of the clutch element 410. A spacer bushing 430 is interposed between the miter gear 426 and the bearing portion 432 in the housing in which the extreme end portion of the shaft is supported.

Manual means is provided for rotating the lead screw 44 which includes a shaft 434 suitably supported in bearings in the housing and disposed transversely to the lead screw 44. On the inner end of the shaft 434 is fixed a miter gear 436 in mesh with the miter gear 426, while the opposite end of the shaft which projects out of the housing is provided with a handwheel 438 for manual rotation of the shaft and consequent rotation of the lead screw 44. The handwheel 438 may be utilized when the clutch 406, 410 is declutched for adjusting the spindle longitudinally to initially set the workpiece according to the setting of the cutting tool. When, however, the clutch is in clutched condition the lead screw is operated by the spindle through the feed means, and the spindle is fed longitudinally in response to its rotation and at a rate according to the setting of the feed means.

The means for clutching and declutching the clutch is arranged for automatically declutching it when the cutting operation is completed. The means is in the form of a clutch shifter having a shaft 440 (Figure 7) suitably mounted in a bore 442 and preferably positioned near the vertical. On the inner or lower end is a clutch shifter 444 having a laterally extending leg 446 in the end of which is mounted a pin 448 extending into the groove 422 in the sliding clutch element 410. On the outer or upper end of the shaft 420 is a handle 450 suitably secured to the shaft as by a knurled arrangement or other convenient means. The handle has a manipulable portion 452 arranged for convenient grasping by the hand and in the under surface of the handle is a hole receiving a pin 454, the other end of which is inserted in a hole in a rod 456. The rod 456 is supported at one end of the housing of the feed means and its other end extends through an opening in the flanged portion of the member 34 on the frame of the lathe. Adjustably slidably mounted on the rod 456 is a collar 458 provided with a set screw 460 arranged so that the collar may be slid along the rod and fixedly set in any adjusted position. The lead screw 44 has threaded engagement in a threaded hole in the member 34, at any convenient place therein, such as in a projection 462 formed on the member.

The clutch 406, 410 may be clutched and declutched manually by manipulation of the clutch shifter handle 452 in response to which the leg 446 on the clutch shifter swings and thereby shifts the clutch element 410 into and out of engagement with the clutch element 406. The automatic declutching feature is provided by contact engagement of the collar 458 with the frame of the lathe. In setting up the lathe for a lathing operation the workpiece 250 is mounted on the spindle, and the spindle is run out to a position wherein the workpiece is disclosed axially beyond the cutting tool, this operation being performed by means of actuation of the handwheel 438 while the clutch in the feed means is declutched. This position is that in which the declutching operation is to be accomplished when an automatic operation is performed. With the parts set according to the above, the collar 458 is slid along the rod 456 to the position wherein it engages the frame of the lathe. The set screw 460 is then tightened and the collar remains in fixed position. The spindle is then run back to the position desired for starting the cutting operation (as in Figure 1), whereupon the clutch is shifted to clutched position manually by manipulating the handle 452. The lathe may then be set in operation and in response to the location of the spindle, the latter is fed axially or longitudinally (to the left of Figure 1) by means of the feed means 42. The movement of the feed means causes the rod 456 to be slid with it, through the medium of the shifter handle 452. Upon engagement of the collar 458 with the frame of the lathe, movement of the rod 456 is checked and continued movement of the feed means relative to the rod causes the rod to swing the clutch handle 452 and shift the clutch to declutched position. Thereafter any continued rotation of the spindle is ineffective for producing a longitudinal feed movement thereof. The machine may then be shut off and the workpiece dismounted therefrom.

All of the working parts of the lathe that may require servicing are easily accessible, and the nature of the parts and elements is such as to adapt the lathe to simple servicing operations.

I claim:

1. In a lathe of the type comprising a rigid base having opposed end walls and opposed side walls, a spindle rotatably and slidably mounted in said end walls, one end of said spindle extending through one of said end walls and being adapted to support a workpiece thereon, and power means for rotating said spindle and the workpiece supported thereby: the improvement comprising tool holder means including a rigid tubular member slidably mounted in said side walls closely adjacent said spindle and said one end wall with one end of said tubular member extending outwardly of said side walls, means for restraining said tubular member from rotation with respect to said base, and a tool gripping device arranged on said one end of said tubular member and on the same side thereof as said spindle and movable laterally of said spindle with said tubular member, said tool gripping device including a guide member for guiding said tool along a line generally parallel to said spindle and locking means for gripping said tool in any position of adjustment along said line.

2. In a lathe of the type comprising a rigid base having opposed end walls and opposed side walls, a spindle rotatably and slidably mounted in said end walls, one end of said spindle extending through one of said end walls and being adapted to support a workpiece thereon, and power means for rotating said spindle and the workpiece supported thereby: the improvement comprising tool holder means including a rigid tubular member slidably mounted in said side walls closely adjacent said spindle and said one end wall with one end of said tubular member extending outwardly of said side walls, means for preventing rotation of said tubular member with respect to said base, screw means for adjustably positioning said tubular member longitudinally of itself with respect to said base, and a tool gripping device arranged on said one end of said tubular member and on the same side thereof as said spindle and movable laterally of said spindle with said tubular member, said tool gripping device permitting adjustable movement of a tool with respect thereto in a direction generally parallel to said spindle.

3. A lathe comprising a rigid base having opposed end walls and opposed side walls, a spindle rotatably and slidably mounted in said end walls, one end of said spindle extending through one of said end walls and being adapted to support a workpiece thereon, tool holder means including a rigid tubular member slidably mounted in said side walls closely adjacent said spindle and said one end wall with one end of said tubular member extending outwardly of said side walls, means for restraining said tubular member from rotation with respect to said base, and a tool gripping device arranged on said one end of said tubular member and on the same side thereof as said spindle and movable laterally of said spindle with said tubular member, said tool gripping device including a guide member for guiding said tool along a line generally parallel to said spindle and locking means for gripping said tool in any position of adjustment along said line, the other end of said spindle extending through the other of said end walls, power transmission means rotatably mounted on said other end of said spindle and axially fixed with respect thereto, a feed screw extending parallel to said spindle and laterally spaced therefrom rotatably mounted in said transmission means and threadedly engaging said base whereby said transmission means is restrained from rotation as a unit with respect to said base, and power means fixed with respect to said base for driving said spindle, said spindle drivingly engaging said feed screw through said transmission means whereby rotation of said spindle causes axial feeding movement of itself, said transmission means being of variable ratio whereby the speed of feeding movement of said spindle may be adjusted with respect to the speed of rotation thereof.

4. A lathe comprising a rigid base having opposed end walls and opposed side walls, a spindle rotatably and slidably mounted in said end walls, one end of said spindle extending through one of said end walls and being adapted to support a workpiece thereon, an adjustable tool holder supported on said base adjacent said one end, the other end of said spindle extending through the other of said end walls, power transmission means rotatably mounted on said other end of said spindle and axially fixed with respect thereto, a feed screw extending parallel to said spindle and laterally spaced therefrom rotatably mounted in said transmission means and threadedly engaging said base whereby said transmission means is restrained from rotation as a unit with respect to said base, and power means fixed with respect to said base for driving said spindle, said spindle drivingly engaging said feed screw through said transmission means whereby rotation of said spindle causes axial feeding movement of itelf, said transmission means being of variable ratio whereby the speed of feeding movement of said spindle may be adjusted with respect to the speed of rotation thereof.

5. A lathe comprising a rigid base having opposed end walls and opposed side walls, a spindle rotatably and slidably mounted in said end walls, one end of said spindle extending through one of said end walls and being adapted to support a workpiece thereon, an adjustable tool holder supported on said base adjacent said one end, the other end of said spindle extending through the other of said end walls, power transmission means rotatably mounted on said other end of said spindle and axially fixed with respect thereto, a feed screw extending parallel to said spindle and laterally spaced therefrom rotatably mounted in said transmission means and threadedly engaging said base whereby said transmission means is restrained from rotation as a unit with respect to said base, and power means fixed with respect to said base for driving said spindle, said spindle drivingly engaging said feed screw through said transmission means whereby rotation of said spindle causes axial feeding movement of itself.

References Cited in the file of this patent

UNITED STATES PATENTS

| | | |
|---|---|---|
| 33,283 | Sellers | Sept. 10, 1861 |
| 441,609 | Beach | Nov. 25, 1890 |
| 1,141,854 | Van Norman | June 1, 1915 |
| 1,299,883 | Warren | Apr. 8, 1919 |
| 1,325,424 | Sundstrand | Dec. 16, 1919 |
| 1,444,394 | Search | Feb. 6, 1923 |

(Other references on following page)

UNITED STATES PATENTS

| | | |
|---|---|---|
| 1,492,174 | Lindholm | Apr. 29, 1924 |
| 1,708,405 | Aff | Apr. 9, 1929 |
| 1,727,984 | Johnson | Sept. 10, 1929 |
| 1,733,578 | Burke | Oct. 29, 1929 |
| 1,806,562 | Pichler | May 19, 1931 |
| 1,967,454 | Storm et al. | July 24, 1934 |
| 2,189,867 | Hagerman | Feb. 13, 1940 |
| 2,211,134 | Kruell | Aug. 13, 1940 |
| 2,257,493 | Blazek et al. | Sept. 30, 1941 |
| 2,341,668 | Staples | Feb. 15, 1944 |
| 2,345,060 | Morton | Mar. 28, 1944 |
| 2,346,660 | Bullard | Apr. 18, 1944 |
| 2,348,805 | Gigger | May 16, 1944 |
| 2,488,696 | Waldron | Nov. 22, 1949 |
| 2,554,102 | Globash | May 22, 1951 |
| 2,679,678 | Stephan | June 1, 1954 |
| 2,736,243 | Armitage | Feb. 28, 1956 |